(12) United States Patent
Aratani (10) Patent No.: US 9,696,543 B2
(45) Date of Patent: Jul. 4, 2017

(54) INFORMATION PROCESSING APPARATUS AND INFORMATION PROCESSING METHOD

(71) Applicant: CANON KABUSHIKI KAISHA, Tokyo (JP)

(72) Inventor: Shinichi Aratani, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 25 days.

(21) Appl. No.: 14/703,056

(22) Filed: May 4, 2015

(65) Prior Publication Data

US 2015/0332506 A1 Nov. 19, 2015

(30) Foreign Application Priority Data

May 14, 2014 (JP) ................. 2014-100786

(51) Int. Cl.
| | | |
|---|---|---|
| G09G 5/00 | (2006.01) | |
| G02B 27/01 | (2006.01) | |
| G06T 19/00 | (2011.01) | |
| G06T 3/00 | (2006.01) | |
| G06T 7/73 | (2017.01) | |

(52) U.S. Cl.
CPC ........... *G02B 27/01* (2013.01); *G02B 27/017* (2013.01); *G06T 3/00* (2013.01); *G06T 7/74* (2017.01); *G06T 19/00* (2013.01); *G06T 19/006* (2013.01); *G02B 2027/014* (2013.01); *G06T 2207/10016* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 2004/0090444 A1* | 5/2004 | Satoh | G06T 7/0044 345/633 |
| 2007/0139322 A1* | 6/2007 | Takemoto | G06F 3/0321 345/87 |
| 2008/0037901 A1* | 2/2008 | Yonezawa | G06K 9/3216 382/291 |

FOREIGN PATENT DOCUMENTS

JP 4689380 B2 2/2011

OTHER PUBLICATIONS

Satoh et al., "A Review of Registration Techniques in Mixed Reality", Journal of the VR Society of Japan, 8(2): pp. 171-180, 2003.

* cited by examiner

*Primary Examiner* — Martin Mushambo
(74) *Attorney, Agent, or Firm* — Carter, DeLuca, Farrell & Schmidt, LLP (57) ABSTRACT

Arrangement positions in a physical space, which are set in advance for a plurality of indices, are acquired. Among indices in an image of the physical space, an index that satisfies a predetermined condition is specified as a target index. Notification of the arrangement position of the target index is performed.

16 Claims, 9 Drawing Sheets

INFORMATION PROCESSING APPARATUS AND INFORMATION PROCESSING METHOD

BACKGROUND OF THE INVENTION

Field of the Invention

The present invention relates to a technique for assisting arrangement of an index.

Description of the Related Art

A mixed reality (MR) technique and an augmented reality (AR) technique are known as techniques by which the real world and the virtual world are merged. These techniques are techniques by which a physical space and a virtual space formed by a computer are merged seamlessly. These techniques are expected to be applied to various areas, such as assembly assistance in which work procedures and wiring are displayed in a superimposing manner at the time of assembly work, operation assistance in which the internal state of a patient is displayed in a superimposing manner on the body surface of the patient, and the like.

A big problem that needs to be solved in order to realize the MR technique is a problem of position alignment. In order for a user to feel that a virtual object is present in the physical space, geometric consistency between the virtual object and the physical space needs to be achieved. In other words, the virtual object needs to always be observed by the user so that it is located at the position at which it is supposed to be present in the physical space.

Also, a video see-through type information processing apparatus is an apparatus according to which an observer feels that the virtual object is present in the physical space. This is an apparatus that captures an image of the real world using a video camera, causes a display unit to display, on a display or the like in real time, a composite image obtained by superimposing the virtual object on the captured image, and provides the composite image to the observer. In general, examples of such information processing apparatuses include mobile information terminals known as tablet terminals having a video camera on the back, a video see-through HMD (head-mounted display), and the like.

With MR using the video see-through HMD, the position and orientation of a camera in the physical space at image capture is measured every time an image is input from the camera built in the HMD. In general, processing is performed in which CG is rendered based on the position and orientation of this camera, and a parameter unique to the camera, such as focal length, and the CG is superimposed on the image in the physical space. Therefore, in the case of MR using the video see-through HMD, the problem of position alignment is a problem relating to measurement of the position and orientation in physical space of the camera built in the HMD. In the past, there have been various research reports about measuring the position and orientation of the camera (Sato, Uchida, and Tamura: A Review of Registration Techniques in Mixed Reality. Journal of the VR society of Japan, 8(2): 171-180, 2003).

The position and orientation of the camera can be measured by, for example, a physical sensor having six degrees of freedom, such as a magnetic sensor, ultrasonic sensor, optical sensor, or the like. On the other hand, in the case where the video see-through HMD is used, it is possible to use image information from the camera built in the video see-through HMD for position alignment. The method for position alignment using image information has been widely used since it is simple and has a lower cost compared with the method using the physical sensor. With the position alignment method using image information, an index whose three-dimensional position in the physical space is known is captured by a camera to estimate the position and orientation of the camera based the correspondence between the position of the index on the captured image and the three-dimensional position. There are cases where markers manually arranged in the physical space, or natural features such as corner points and edges that are originally present in the physical space are used as indices.

There are cases in which the image features of indices in the image capture range cannot be sufficiently captured due to the position and orientation of the camera. For example, in the case where a person experiencing MR approaches CG so as to observe it, the indices are not in the angle of view of the camera, and thus the image cannot be captured. Also, in the case where the indices have a planar shape, if the image capture is performed in a direction orthogonal to the normal line of the plane, it is not possible to sufficiently capture the image of the indices. Therefore, it is important to arrange the indices such that the image features of the indices are sufficiently captured at any position and orientation of the camera. However, in the case where a plurality of indices are arranged, there is a possibility that the load for index detection will increase and index detection cannot be performed in real-time. Also, in MR where the physical space and CG are composited, inconveniences such as the beauty of a scene being ruined and the like occur.

In view of this, conventionally, indices have been arranged in accordance with guidelines derived from some kind of experience-based knowledge so that the indices are appropriately distributed and captured at an appropriate size. Furthermore, in the case where there are many indices, a design diagram that illustrates the location and type of indices that are to be arranged in the physical space is created.

With the technique described in Japanese Patent No. 4689380, indices that have already been arranged are used to present a location where a new index is to be arranged to a person arranging indices, so that appropriate indices can be arranged by a person experiencing MR. With the technique described in Japanese Patent No. 4689380, it is premised that precise position alignment can be performed using the indices that have already been arranged. A position at which a "precise position alignment region" that is determined using the already-arranged indices and a region where indices are to be arranged are overlapped seamlessly but not overlapped too much is superimposed on the physical space and presented as information for arranging indices that are to be newly added thereto.

With Japanese Patent No. 4689380, it is premised that precise position alignment is realized using prearranged indices, and it is an object thereof to add indices that are to be newly arranged. Thus, in a state before indices are arranged, it is not possible to present the position at which the indices are to be arranged.

Also, even if there is a design diagram for index arrangement created based on some kind of guideline, indices that are identified by a camera are designed to be easily identified by a computer, and therefore a person cannot easily identify them by just looking at the diagram. Therefore, there has been an issue in that it is difficult for a person to understand where indices are to be arranged in the physical space if he or she looks at only the printed design diagram or arrangement information displayed on a monitor.

SUMMARY OF THE INVENTION

The present invention has been made in view of such problems, and provides a technique for performing arrangement assistance when indices that are to be used for estimating the position and orientation of an image sensing device or the like are arranged in the physical space.

According to the first aspect of the present invention, there is provided an information processing apparatus comprising: an acquiring unit configured to acquire arrangement positions in a physical space, which are set in advance for a plurality of indices; a specifying unit configured to, among indices in an image of the physical space, specify an index that satisfies a predetermined condition as a target index; and a notification unit configured to perform notification of the arrangement position of the target index.

According to the second aspect of the present invention, there is provided an information processing method performed by an information processing apparatus, comprising: an acquiring step of acquiring arrangement positions in a physical space, which are set in advance for a plurality of indices; a specifying step of, among indices in an image of the physical space, specifying an index that satisfies a predetermined condition as a target index; and a notification step of performing notification of the arrangement position of the target index.

Further features of the present invention will become apparent from the following description of exemplary embodiments with reference to the attached drawings.

DESCRIPTION OF THE EMBODIMENTS

Hereinafter, embodiments of the present invention will be described with reference to the accompanying drawings. It should be noted that the embodiments described hereinafter are merely examples of cases in which the present invention is specifically implemented, and are specific examples of configurations described in the claims.

First Embodiment

This embodiment will describe a system by which a user is notified of the actual locations in a physical space of arrangement positions for a plurality of indices that are to be arranged in the physical space, although the arrangement positions for the plurality of indices are determined in advance. An example of the external appearance and environment of the system according to the present embodiment will be described with reference to FIG. 2.

Figure 2:
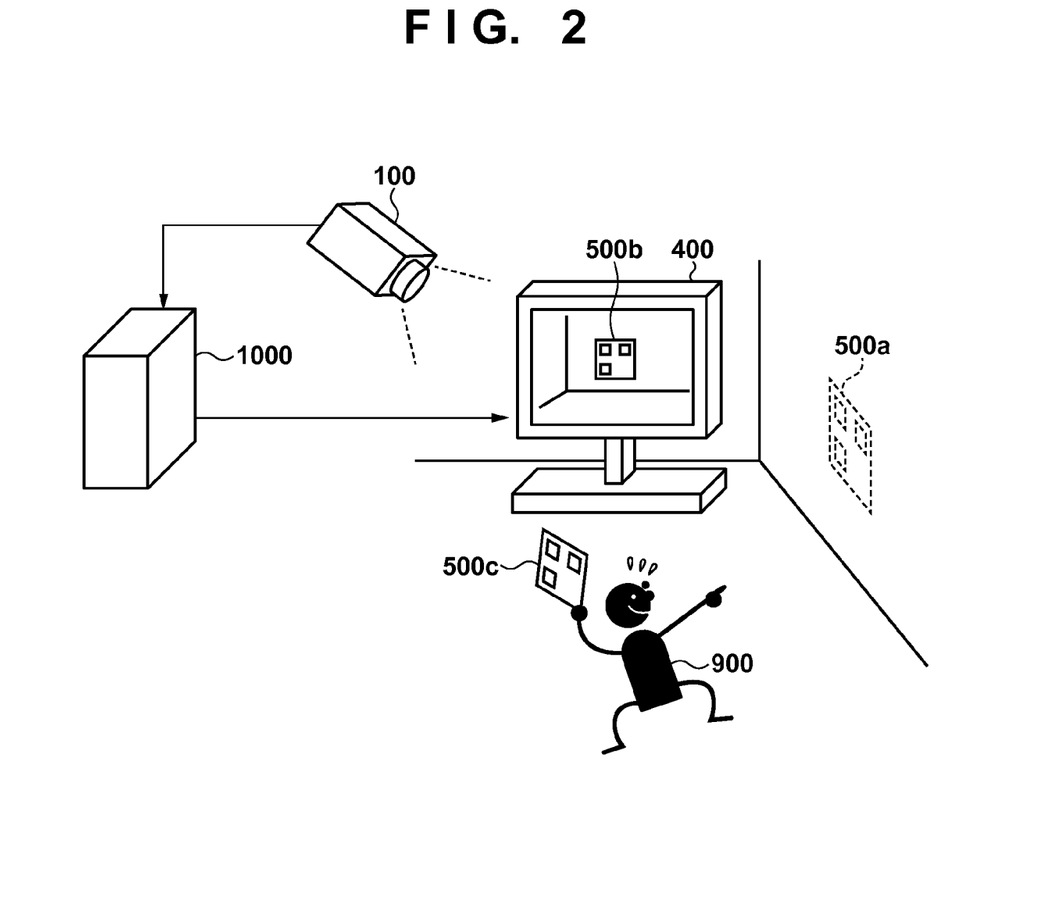
FIG. 2 is a diagram showing the external appearance and the environment of the system.

A user 900 holds an index 500c in his or her hand, and is going to arrange this index 500c in the physical space. The position at which this index 500c is to be arranged (arrangement position) is determined in advance as indicated by reference numeral 500a, and is registered in an information processing apparatus 1000 as data. However, even if the arrangement position of the index 500c is registered in the information processing apparatus 1000 as data, the user 900 does not know the location in the physical space that the arrangement position actually corresponds to.

In view of this, in the present embodiment, the situation of the physical space is captured by an image sensing device 100 and the captured image is displayed on a display unit 400 via the information processing apparatus 1000, and in the case where this captured image includes the index 500c that the user is going to arrange, the information processing apparatus 1000 notifies the user of the location on the captured image that corresponds to the "arrangement position of the index 500c" held by the information processing apparatus 1000. In FIG. 2, an image 500b that represents the index 500c is composited and displayed at this location, and as a result of the user looking at this composite image, he or she can understand the position indicated by reference numeral 500a in the physical space.

Figure 1:
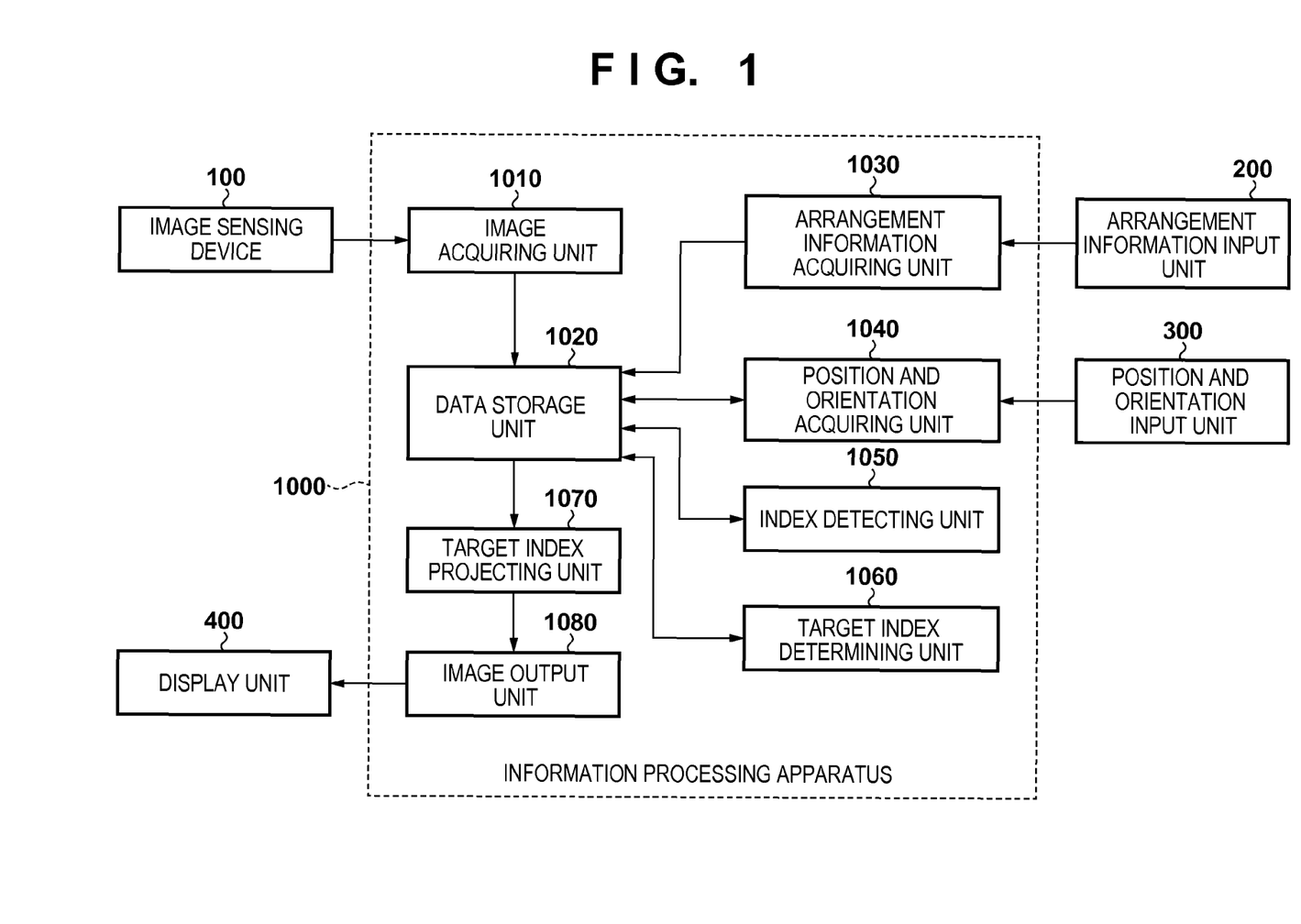
FIG. 1 is a block diagram showing a configuration example of a system.

Next, a configuration example of a system according to the present embodiment will be described with reference to the block diagram shown in FIG. 1. As shown in FIG. 1, the system according to the present embodiment includes the image sensing device 100, the display unit 400, an arrangement information input unit 200, a position and orientation input unit 300, and the information processing apparatus 1000.

First, the image sensing device 100 will be described. The image sensing device 100 is a device that captures a moving image (that includes sequential still images) in the physical space, and in the present embodiment, it is assumed that the image sensing device 100 is arranged in a fixed manner somewhere in the physical space, such as the ceiling. In other words, it is assumed that all of internal parameters such as a distortion correction coefficient and focal length, and external parameters such as position and orientation have been already corrected and fixed. However, depending on the embodiment, parameters are not limited to these, and it is sufficient that even if these parameters change, parameters at the time of changing can be acquired.

Next, the display unit 400 will be described. The display unit 400 is configured by a CRT, a liquid crystal screen, or the like, and can display the result of processing performed by the information processing apparatus 1000 using images, letters, and the like. It should be noted that the display unit 400 may be a display apparatus that is arranged in a fixed manner in the physical space, or may be a display apparatus included in a head-mounted display apparatus.

Next, the arrangement information input unit 200 will be described. The arrangement information input unit 200 is for inputting arrangement information that includes the arrangement positions of indices that are to be arranged in the physical space in the future and identifiers that are unique to the indices, to the information processing apparatus 1000. The arrangement information input unit 200 may be a user interface (a keyboard or mouse) that the user operates to input arrangement information on each index, or may be a device (hard disk drive device or a server device) in which arrangement information on each index has been registered in advance. In other words, the arrangement information input unit 200 may be any device as long as it can supply arrangement information on each index to the information processing apparatus 1000. In other words, there are various methods for inputting arrangement information on each index to the information processing apparatus 1000, and the input method is not limited to a specific input method.

Next, the position and orientation input unit 300 will be described. The position and orientation input unit 300 is for inputting the position and orientation of the image sensing device 100 to the information processing apparatus 1000. The position and orientation input unit 300 may be a user interface (a keyboard or mouse) that the user operates to input the position and orientation of the image sensing device 100, or may be a device (hard disk drive device or a sever device) in which the position and orientation of the image sensing device 100 has been registered in advance. Also, the position and orientation input unit 300 may be a sensor that measures the position and orientation of the image sensing device 100. In this case, the position and orientation relationship between the image sensing device 100 and the sensor has been corrected in advance, and a measurement value obtained by the sensor may be used as the position and orientation of the image sensing device 100, and a position and orientation obtained by performing appropriate transformation on the measurement value obtained by the sensor may be used as the position and orientation of the image sensing device 100. In this manner, the position and orientation input unit 300 can be any device as long as it can supply the position and orientation of the image sensing device 100 to the information processing apparatus 1000. In other words, there are various methods for inputting the position and orientation of the image sensing device 100 to the information processing apparatus 1000, and the input method is not limited to a specific input method.

Next, the information processing apparatus 1000 will be described. An image acquiring unit 1010 acquires images in frames sequentially sent out from the image sensing device 100, and stores the acquired images in a later-stage data storage unit 1020.

It should be noted that a method according to which the data storage unit 1020 obtains an image of the physical space is not limited to the above-described method, and for example, a moving image of the physical space that has been stored in advance in an external memory such as a hard disk device may be read out to the data storage unit 1020. Also, the image of the physical space in each frame transmitted from a device connected to this apparatus via a network may be acquired so that the data storage unit 1020 obtains the image.

An arrangement information acquiring unit 1030 acquires arrangement information on each index input using the arrangement information input unit 200, and stores the acquired arrangement information in the later-stage data storage unit 1020. A position and orientation acquiring unit 1040 acquires the position and orientation of the image sensing device 100 input using the position and orientation input unit 300, and stores the acquired position and orientation in the later-stage data storage unit 1020.

An index detecting unit 1050 sequentially reads out images in frames stored in the data storage unit 1020, and detects indices from the readout images. Here, indices and the detection of the indices will be described with reference to FIGS. 3A to 3C.

Figure 3A:
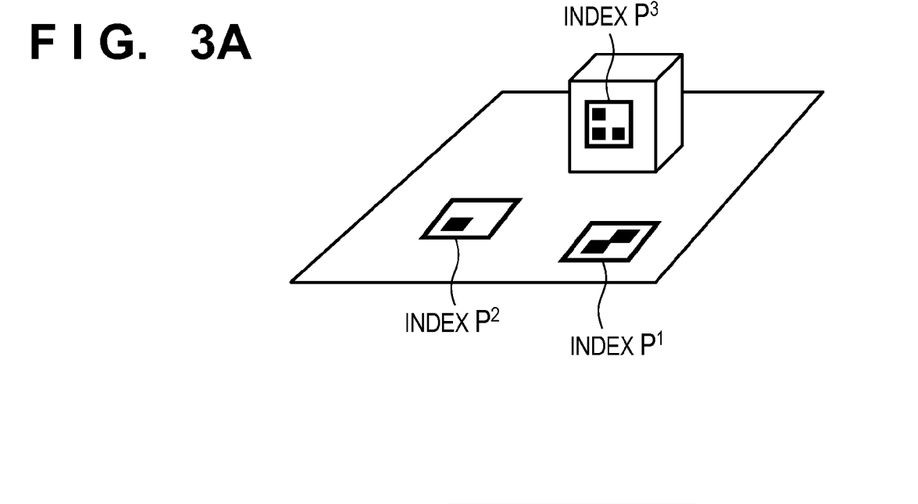
FIG. 3A is a diagram illustrating an arrangement example of square indices.
Figure 3B:
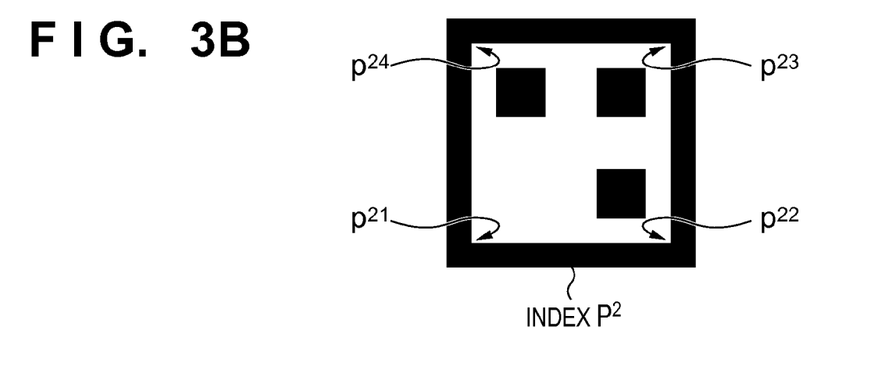
FIG. 3B is a diagram illustrating a square index.

FIG. 3A shows a situation in which three square indices ($P^1$, $P^2$, $P^3$) are arranged in the physical space. As shown in FIG. 3B (in FIG. 3B, the index $P^2$ is used as an example), this square index has a pattern representing an identifier unique to itself in its interior, and has apexes $P^{21}$, $P^{22}$, $P^{23}$, and $P^{24}$.

In the case where such an index is detected in the image, the index detecting unit 1050 performs binarization processing on the image and then performs labeling processing to extract a region formed by four straight lines from regions having a given area or greater, as a candidate region. Then, the index detecting unit 1050 determines whether or not the extracted candidate regions respectively have a specific pattern (pattern representing the identifier of the index) so as to determine whether or not each candidate region is a region for an index. Then, if it is determined that a candidate region has the index, the index detecting unit 1050 reads out the pattern from the candidate region, and based on the readout pattern, the index detecting unit 1050 detects the identifier of the index and the position of the index in the image. Then, with respect to each index detected in the image, the index detecting unit 1050 registers the identifier of the index and the position of the index in the image as a set in the data storage unit 1020.

Figure 3C:
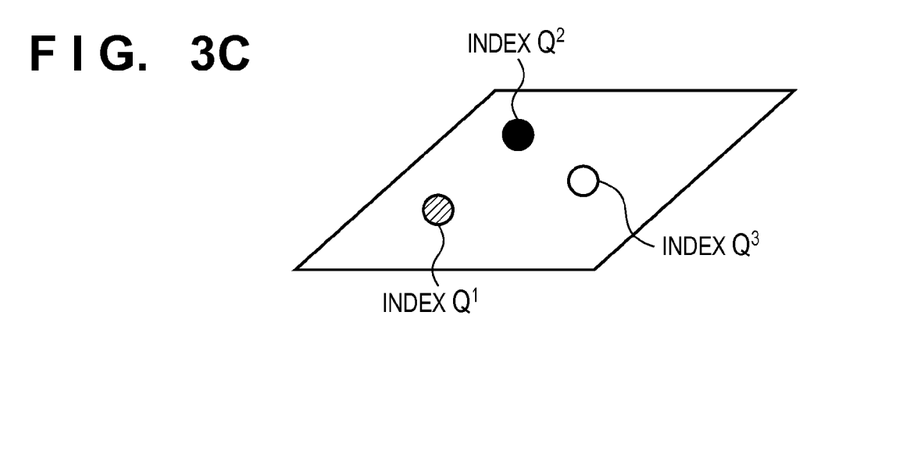
FIG. 3C is a diagram illustrating point indices.

Naturally, the shape of the indices is not limited to being a square, and may be an n-gon (n is an integer of 5 or more). Also, as shown in FIG. 3C, the indices may be point indices such as circular indices that each have a different color. In this case, the index detecting unit 1050 detects a region corresponding to the color of each index from the image, and then allows the centroid position of the detected region to be detection coordinates of the index.

Also, feature points (natural feature points) that respectively have different texture features may be used as the point indices. In this case, the index detecting unit 1050 performs template matching on the image using a template image of each index that has been held in advance as known information to extract the indices from the image. The indices are not limited to this, and any indices can be used as long as they are to be fixed in a space and can be detected in an image of the fixed indices.

In this manner, the indices that can be used in the present embodiment can be any indices as long as they can be detected in an image, and the identifiers thereof and the positions (image coordinates) thereof in the image can be detected.

A target index determining unit 1060 specifies an index that satisfies a predetermined condition among the indices that the index detecting unit 1050 detected in the image as a target index. There are various methods for specifying a target index, and these will be described later in detail. Then, among the sets (sets of identifiers and image coordinates) for each index stored in the data storage unit 1020, the target index determining unit 1060 manages the set for the target index in the data storage unit 1020 such that it can be identified from among the other sets.

A target index projecting unit 1070 obtains a projection position (corresponding position) obtained by projecting the arrangement position of the target index in the arrangement information registered in the data storage unit 1020 on the image readout from the data storage unit 1020, and then sends the obtained projection position to an image output unit 1080 along with the image.

Upon receiving the image and the projection position from the target index projecting unit 1070, the image output unit 1080 generates a composite image obtained by compositing information indicating that "the projection position is a position at which the target index is to be arranged" on the image, and then sends out the generated composite image to the display unit 400.

Figure 4:
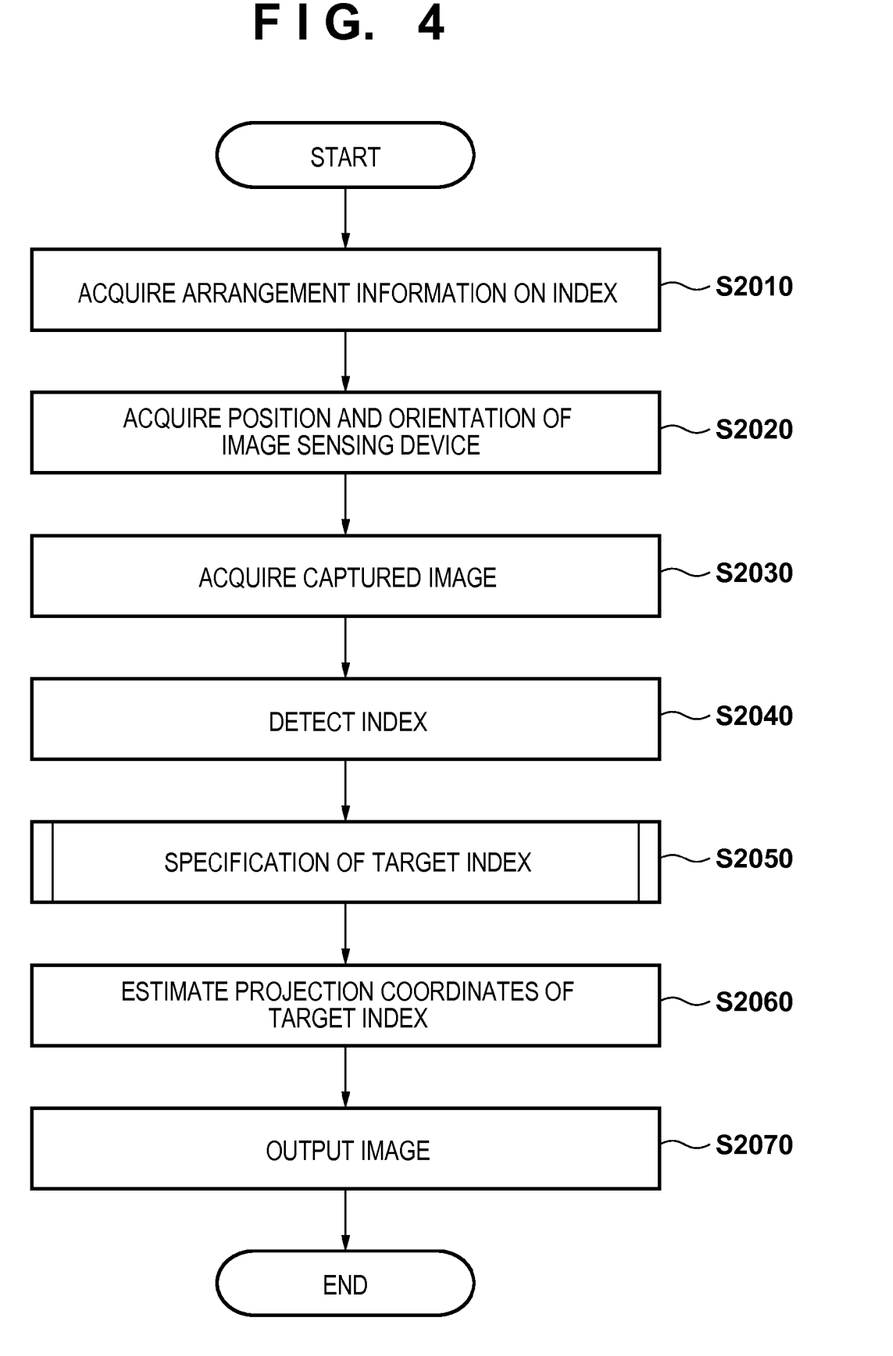
FIG. 4 is a flowchart of processing performed by an information processing apparatus 1000.

Next, sequential processing performed by the information processing apparatus 1000 to composite information indicating the position at which the target index is to be arranged on the image obtained by the image sensing device 100 and then output the information will be described with reference to a flowchart shown in FIG. 4. It should be noted that processing according to the flowchart in FIG. 4 is performed on the image in each frame sent out from the image sensing device 100.

Step S2010

The arrangement information acquiring unit 1030 acquires the arrangement information on each index input by the arrangement information input unit 200 and then stores the acquired arrangement information in the data storage unit 1020. It should be noted that hereinafter, it is assumed that the arrangement position of each index is in a world coordinate system (a coordinate system where there is one origin in the physical space, and three axes orthogonal to each other at the origin respectively indicate the x axis, y axis, and z axis), but depending on the processing content, it may be an arrangement position in another coordinate system.

Step S2020

The position and orientation acquiring unit 1040 acquires the position and orientation of the image sensing device 100 input using the position and orientation input unit 300, and stores the acquired position and orientation in the data storage unit 1020. It should be noted that although it is assumed that the position and orientation of the image sensing device 100 is in the world coordinate system, depending on processing content, it may be a position and orientation in another coordinate system. Also, it is assumed that the above-described internal parameters of the image sensing device 100 have been registered in the data storage unit 1020 in advance. Naturally, these internal parameters may be input into the data storage unit 1020 using the position and orientation input unit 300.

Step S2030

The image acquiring unit 1010 acquires the image that is obtained by capturing the physical space and is sent out from the image sensing device 100, and stores the acquired captured image in the data storage unit 1020.

Step S2040

The index detecting unit 1050 uses the captured image (or an image that was registered the earliest in the data storage unit 1020 and on which index detection has not yet been performed) stored in the data storage unit 1020 in step S2030 as the target image on which to perform processing for detecting indices in the target image.

In the case where the target image includes n square indices $P^{kn}$ (n=1, . . . , N), the index detecting unit 1050 stores an identifier kn and image coordinates of a point calculated from image coordinates $u^{Pkni}$ of four apexes $p^{kni}$ (i=1, 2, 3, and 4) as a set in the data storage unit 1020. The image coordinates of the point calculated from the image coordinates of the four apexes may be the average image coordinates of the image coordinates of the four apexes, and may be one of the image coordinates of the four apexes.

In the case of FIG. 3A, the captured image includes three indices, and the later-described three sets are stored in the data storage unit 1020.

{identifier k1=1, image coordinates of one point calculated from $u^{Pk11}$, $u^{Pk12}$, $u^{Pk13}$, and $u^{Pk14}$}

{identifier k2=2, image coordinates of one point calculated from $u^{Pk21}$, $u^{Pk22}$, $u^{Pk23}$, and $u^{Pk24}$}

{identifier k3=3, image coordinates of one point calculated from $u^{Pk31}$, $u^{Pk32}$, $u^{Pk33}$, and $u^{Pk34}$}

Step S2050

The target index determining unit 1060 uses the target image and the captured image that is one frame prior to the target image (past captured image) to specify an index that satisfies a predetermined condition from the indices detected in the target image, as the target index. Then, among the sets for each index stored in the data storage unit 1020, the target index determining unit 1060 manages the set for the target index in the data storage unit 1020 such that it can be identified from among the other sets. It is sufficient that this is managed such that the identifier of the target index can be identified from among the identifiers of non-target indices.

Figure 5:
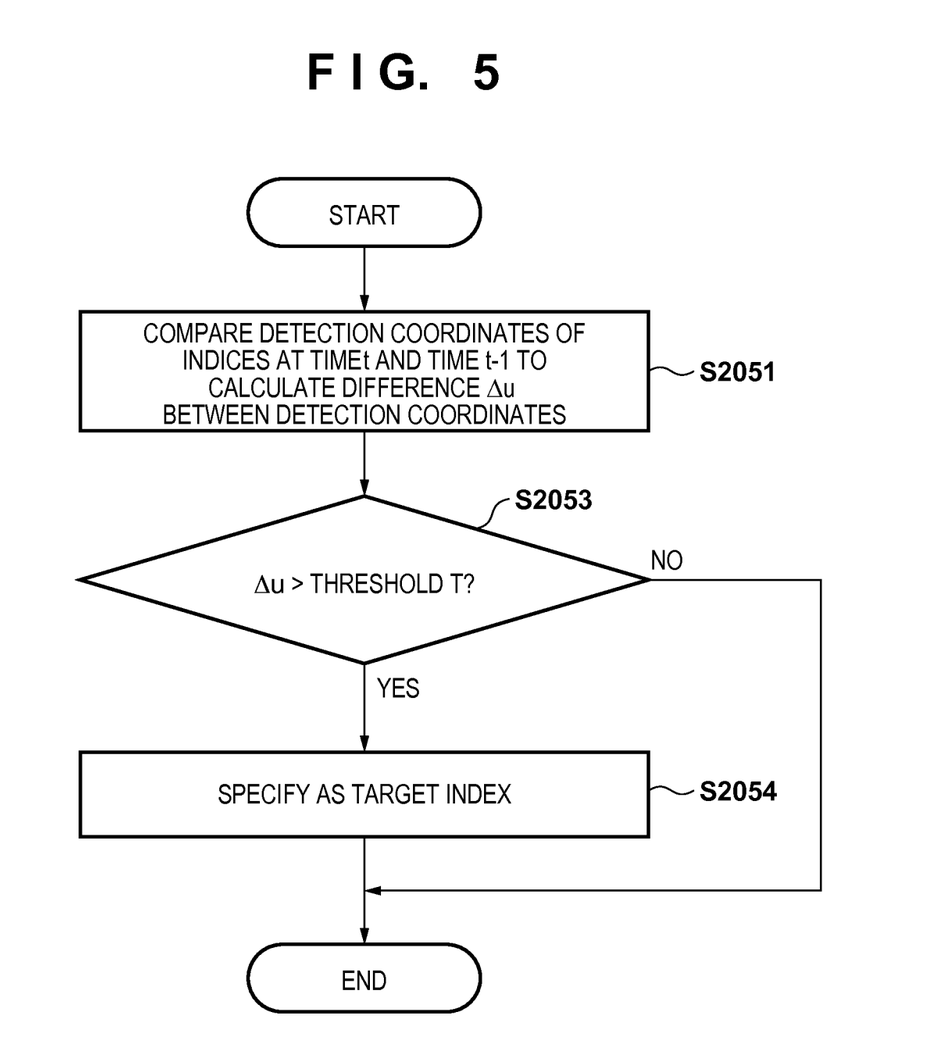
FIG. 5 is a flowchart showing the details of processing in step S2050.

Details of processing in step S2050 will be described with reference to the flowchart shown in FIG. 5. It should be noted that the processing according to the flowchart of FIG. 5 is performed on each index detected in the target image. In the following description, processing that is performed on an index of interest among indices detected in the target image will be described as an example, but similar processing is performed on the other indices.

Step S2051

First, an identifier that is the same as the index of interest detected in the target image is specified from among the identifiers of the indices detected in the past captured images, and image coordinates in the same set as the specified identifier are acquired. Then, a difference $\Delta u$ between the acquired image coordinates and the image coordinates of the index of interest detected in the target image is obtained.

Step S2053

It is determined that the difference $\Delta u$ is greater than a predetermined threshold T. As a result of this determination, if $\Delta u > T$, then the processing moves to step S2054, whereas if $\Delta u \leq T$, then the processing according to the flowchart of FIG. 5 that relates to the index of interest ends.

Step S2054

The set that was registered for the index of interest in the data storage unit 1020 is used as the set for the target index, and the set for the target index is managed so as to be identified from among the sets of the non-target indices. In other words, as a result of performing the processing according to the flowchart of FIG. 5 on each index detected in the target image, among the indices detected in the target image, an index that moves by more than a threshold in the image can be detected as the target index, and for example, in the case where the user holds indices in his or her hand so as to arrange them, it is possible to specify the "index that is to be arranged in the future" held in his or her hand as the target index.

Step S2060

Among pieces of arrangement information on the indices stored in the data storage unit 1020, the target index projecting unit 1070 first specifies arrangement information including the identifier of the target index specified in step S2050 as the arrangement information on the target index. Then, the target index projecting unit 1070 obtains a projection position (ux, uy) at which the arrangement position in the specified arrangement information is projected on the target image using the position and orientation of the image sensing device 100. Here, processing for obtaining this projection position (ux, uy) will be described.

Figure 6:
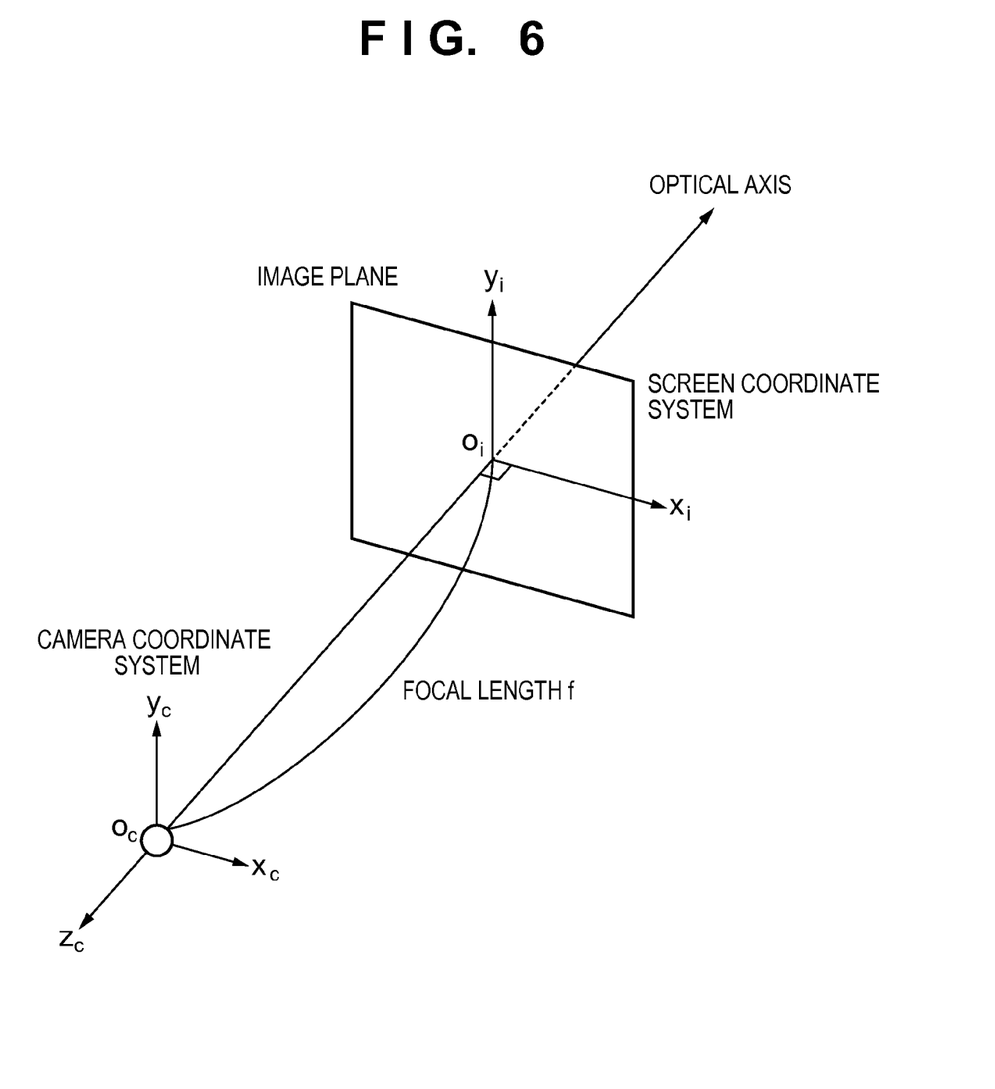
FIG. 6 is a diagram illustrating perspective projection transformation.

First, perspective projection transformation will be described. FIG. 6 is a diagram illustrating a camera coordinate system (for example, coordinate system where the lens position of the image sensing device 100 is the origin, and three axes orthogonal at the origin indicate the x axis, y axis, and z axis) and a screen coordinate system (coordinate system defined by the image capture plane of the image sensing device 100). An origin oi of the screen coordinate system is the intersection point of the optical axis and the image plane, the horizontal direction of the image is the xi axis and the vertical direction is the yi axis. Also, a length from the origin oc of the camera coordinate system to the image plane (focal length) is f, the zc axis of the camera coordinate system is the reverse direction of the optical axis, the xc axis is parallel to the horizontal direction of the image, and the yc axis is parallel to the vertical direction of the image.

Due to the perspective projection transformation, a point $xc=[xc\ yc\ zc]^t$ on the camera coordinate system is projected on a point having image coordinates $u=[ux\ uy]^t$ as with the following formula (1).

[Equation 1]

$$u_x = -f\frac{x_c}{z_c}$$
$$u_y = -f\frac{y_c}{z_c}$$
(1)

As shown in FIG. 6, the formula (1) indicates that a point in the space, the projection point of the point on the image, and the camera position (viewpoint) are on the same straight line, and the formula (1) is also referred to as a collinear condition equation. Let the position of the image sensing device in the world coordinate system be $t=[tx\ ty\ tz]^t$, and let the orientation of the image sensing device (in actuality, the orientation of the world coordinate system relative to the camera coordinate system) be $\omega=[\omega x\ \omega y\ \omega z]$. $\omega$ is an orientation expression method having three degrees of freedom, and the orientation is expressed by a rotation axis vector and a rotation angle. Letting the rotation angle be ra, ra is represented using $\omega$ as indicated by the following formula (2).

[Equation 2]

$$r_a = \sqrt{\omega_x^2 + \omega_y^2 + \omega_z^2}$$
(2)

Also, letting the rotation axis vector be $r=[rx\ ry\ rz]^t$, the relationship between r and $\omega$ is represented as indicated by the following formula (3).

[Equation 3]

$$[\omega_x \omega_y \omega_z] = [r_a r_x r_a r_y r_a r_z]$$
(3)

The relationship between $\omega$ (rotation angle ra, rotation axis vector r) and 3×3 rotation transformation matrix R is represented as indicated by the following formula (4).

[Equation 4]

$$R = \begin{bmatrix} R_{11} & R_{12} & R_{13} \\ R_{21} & R_{22} & R_{23} \\ R_{31} & R_{32} & R_{33} \end{bmatrix}$$

$$= \begin{bmatrix} r_x^2(1-\cos r_a)+\cos r_a & r_x r_y(1-\cos r_a)-r_z\sin r_a & r_z r_y(1-\cos r_a)+r_y\sin r_a \\ r_x r_y(1-\cos r_a)+r_z\sin r_a & r_y^2(1-\cos r_a)+\cos r_a & r_y r_z(1-\cos r_a)-r_x\sin r_a \\ r_z r_x(1-\cos r_a)-r_y\sin r_a & r_y r_z(1-\cos r_a)+r_x\sin r_a & r_z^2(1-\cos r_a)+\cos r_a \end{bmatrix}$$
(4)

Here, the position of the target index in the world coordinate system is represented by a point $x_w=[x_w\ y_w\ z_w]^t$, and the position represents the arrangement information on the target index.

The camera coordinates xc of the point $x_w=[x_w\ y_w\ z_w]^t$ in the world coordinate system is represented using t and R as indicated by the following formula (5).

[Equation 5]

$$\begin{bmatrix} x_c \\ y_c \\ z_c \end{bmatrix} = R\begin{bmatrix} x_w - t_x \\ y_w - t_y \\ z_w - t_z \end{bmatrix} = \begin{bmatrix} R_{11} & R_{12} & R_{13} \\ R_{21} & R_{22} & R_{23} \\ R_{31} & R_{32} & R_{33} \end{bmatrix}\begin{bmatrix} x_w - t_x \\ y_w - t_y \\ z_w - t_z \end{bmatrix}$$
(5)

The point $x_w=[x_w\ y_w\ z_w]^t$ in the world coordinate system is projected on a point $u=[ux\ uy]^t$ on the image as indicated by the following formula (6) by perspective projection transformation based on the formulas (1) and (5).

[Equation 6]

$$u_x = -f\frac{x_c}{z_c} = -f\frac{R_{11}(x_w-t_x)+R_{12}(y_w-t_y)+R_{13}(z_w-t_z)}{R_{31}(x_w-t_x)+R_{32}(y_w-t_y)+R_{33}(z_w-t_z)}$$

$$u_y = -f\frac{y_c}{z_c} = -f\frac{R_{21}(x_w-t_x)+R_{22}(y_w-t_y)+R_{23}(z_w-t_z)}{R_{31}(x_w-t_x)+R_{32}(y_w-t_y)+R_{33}(z_w-t_z)}$$
(6)

As described above, it is possible to estimate the projection coordinates ($u_x$, $u_y$) of the target index based on the position and orientation of the image sensing device and the arrangement position of the target index. Then, the target index projecting unit 1070 sends out the projection position obtained in this manner to the image output unit 1080 along with the target image.

Step S2070

The image output unit 1080 generates a composite image by compositing information indicating the projection position of the target image on the target image. For example, a marker image that represents an index may be composited at the projection position on the target image, or an arrow that indicates the projection position may be composited on the target image. In short, any type of information can be adopted as this type of information as long as a user looking at the information that indicates the projection position on this target image can understand the corresponding location in the physical space.

In this manner, according to the present embodiment, when the index is arranged in the physical space, the index that is to be arranged is specified as the target index, and based on the position and orientation of the image sensing device and the arrangement information on the target index, the projection position of the target index is estimated and presented to the user, as a result of which it is possible to notify the user of the position at which the index is to be arranged in the physical space. Accordingly, when the user arranges an index that is designed such that a computer can easily identify the index but it is difficult for a person to easily identify when looking at, it is possible to perform presentation so that the user can easily arrange the index in a short time.

Variation

In the description above, an index having a large motion amount between frames is specified as the target index, but as described above, the method for specifying the target index is not limited to this. For example, if the difference between image coordinates where an index is detected and projection coordinates obtained by projecting (projecting using a projection method similar to the first embodiment) the arrangement position in the arrangement information of that index on the captured image is greater than or equal to a predetermined value, that index may be specified as the target index, among the indices in the captured image. In other words, even if the arrangement position has been determined in advance, in the case where the index is not at the arrangement position due to the fact that the user is still holding it in his or her hand, or has already arranged it at a wrong position, this index is specified as the target index, and the user is notified of the arrangement position.

Second Embodiment

With the first embodiment, some kind of information is displayed at the projection position or in the vicinity thereof, the projection position being obtained by projecting the arrangement position of the target index on the captured image based on the position and orientation of the image sensing device 100. However, in the case where this projection position is located at a position outside of the captured image, information for performing notification of the projection position is not composited on this captured image. In view of this, with this embodiment, if such a case occurs, pan-tilt-zoom of an image sensing device 100 is controlled such that an image can be captured so as to include the projection position. Thus, in the case of the present embodiment, the image sensing device 100 is an image sensing device that can control pan-tilt-zoom using a control signal from an information processing apparatus 1000. Examples of such image sensing devices include network cameras that can remotely control pan, tilt, or zoom. Also, other examples include cameras such as a USB camera, 1394 camera, and the like.

If pan or tilt is controlled, the position and orientation of the image sensing device 100 change. Also, if zoom is controlled, parameters for correcting lens distortion and parameters unique to the camera such as focal length change. In view of this, it is sufficient to change camera parameters in accordance with a change amount obtained by changing pan, tilt, or zoom of the image sensing device 100. Calibration has been performed in advance such that a pan or tilt amount indicates rotation of image capture. A method for calibration may be any known method. Also, camera parameters such as focal length and distortion correction coefficient, which are to be transformed in accordance with a zoom amount, have been obtained for each zoom value in advance to create a look up table. As a result of referencing the table, the camera parameter for each zoom value can be used.

In such a configuration, in the case where it is determined that the projection position is located at a position outside of image coordinates on the captured image, a target index projecting unit 1070 sends out a control signal for controlling at least one of pan, tilt, and zoom to the image sensing device 100, and thus the image sensing device 100 controls at least one of pan, tilt, and zoom in accordance with this control signal. Thereafter, processing similar to that of the first embodiment is performed, except that the camera parameter resulting from this control is used. In the case where the projection position is still located at a position outside of the image coordinates on the captured image, at least one of pan, tilt, and zoom is further controlled. Accordingly, finally, the projection position reaches the image coordinates on the captured image.

In this manner, according to the present embodiment, when the index is arranged in the physical space, even in the case where the index that is to be arranged is specified as the target index and a projection position for the target index estimated from the position and orientation of the image sensing device and the arrangement information on the target index is not in the angle of view of the image sensing device, the projection position can be brought into the angle of view as a result of at least one of pan, tilt, and zoom of the image sensing device being controlled such that the projection position is in the angle of view.

Third Embodiment

With first and second embodiments, information indicating the arrangement position of the target index is composited on the image displayed on the display unit 400, but another method can be adopted as long as the arrangement position of the target index can be presented to the user. With this embodiment, information indicating that the arrangement position is a position at which the target index is to be arranged is projected on the arrangement position of the target index.

First, a configuration example of a system according to the present embodiment will be described with reference to the block diagram shown in FIG. 7. It should be noted that functional units that are the same as the functional units shown in FIG. 1 are denoted by the same reference numerals in FIG. 7, and description relating to these functional units is omitted. Also, hereinafter, the configuration example will be described focusing on differences from the first embodiment, and it is similar to the first embodiment unless particularly stated otherwise hereinafter.

Also, the present embodiment is different from the system according to the first embodiment in that an information processing apparatus 2000 is used instead of the information processing apparatus 1000, and a position and orientation input unit 500 is connected to the information processing apparatus 2000.

In the present embodiment, the display unit 400 is a projecting apparatus (projector) that projects images and letters output from the image output unit 1080 on a screen, a wall, or the like.

The position and orientation input unit 500 is for inputting the position and orientation of the display unit 400 to the information processing apparatus 2000. The position and orientation input unit 500 may be a user interface (a keyboard or mouse) that the user operates to input the position and orientation of the display unit 400, or may be a device (hard disk drive device or a sever device) in which the position and orientation of the display unit 400 has been registered in advance. Also, the position and orientation input unit 500 may be a sensor that measures the position and orientation of the display unit 400. In this case, the position and orientation relationship between the display unit 400 and the sensor has been corrected in advance, and the measurement value obtained by the sensor may be the position and orientation of the display unit 400, or position and orientation obtained by performing appropriate transformation on the measurement value obtained by the sensor may be the position and orientation of the display unit 400. Also, a configuration may be used in which a pattern such as a check pattern or the like is projected on a plane plate using the display unit 400, the check pattern is detected in an image captured by the image sensing device whose position and orientation is known, and external and internal parameters are corrected so as to obtain a corresponding point, as a result of which the position and orientation of the display unit 400 is estimated. It should be noted that the internal parameters, which are unique to the display unit 400, such as the focal length, an image center, lens distortion, and the like, of the display unit 400 are obtained using a known method and the obtained parameters are registered in the data storage unit 1020 in advance.

In this manner, any apparatus can be used as long as the position and orientation of the display unit 400 can be supplied to the information processing apparatus 2000. In other words, there are various methods for inputting the position and orientation of the display unit 400 to the information processing apparatus 2000, and the input method is not limited to a specific input method.

When a position and orientation acquiring unit 1090 acquires the position and orientation of the display unit 400 that was input using the position and orientation input unit 500, the position and orientation acquiring unit 1090 stores the acquired position and orientation in the data storage unit 1020.

Similarly to the first embodiment, when the target index projecting unit 1070 obtains a projection position at which the arrangement position of a target index is projected on a display surface (image display surface) where a projection image is displayed in the display unit 400 (in the projecting apparatus) based on the position and orientation of the display unit 400, the target index projecting unit 1070 sends out the projection position to the image output unit 1080.

Upon receiving the projection position from the target index projecting unit 1070, the image output unit 1080 generates a display image that displays information indicating that "the projection position is the position at which the target index is to be arranged" on the display surface (image display surface) of the display unit 400, and sends out the generated display image to the display unit 400.

Figure 8:
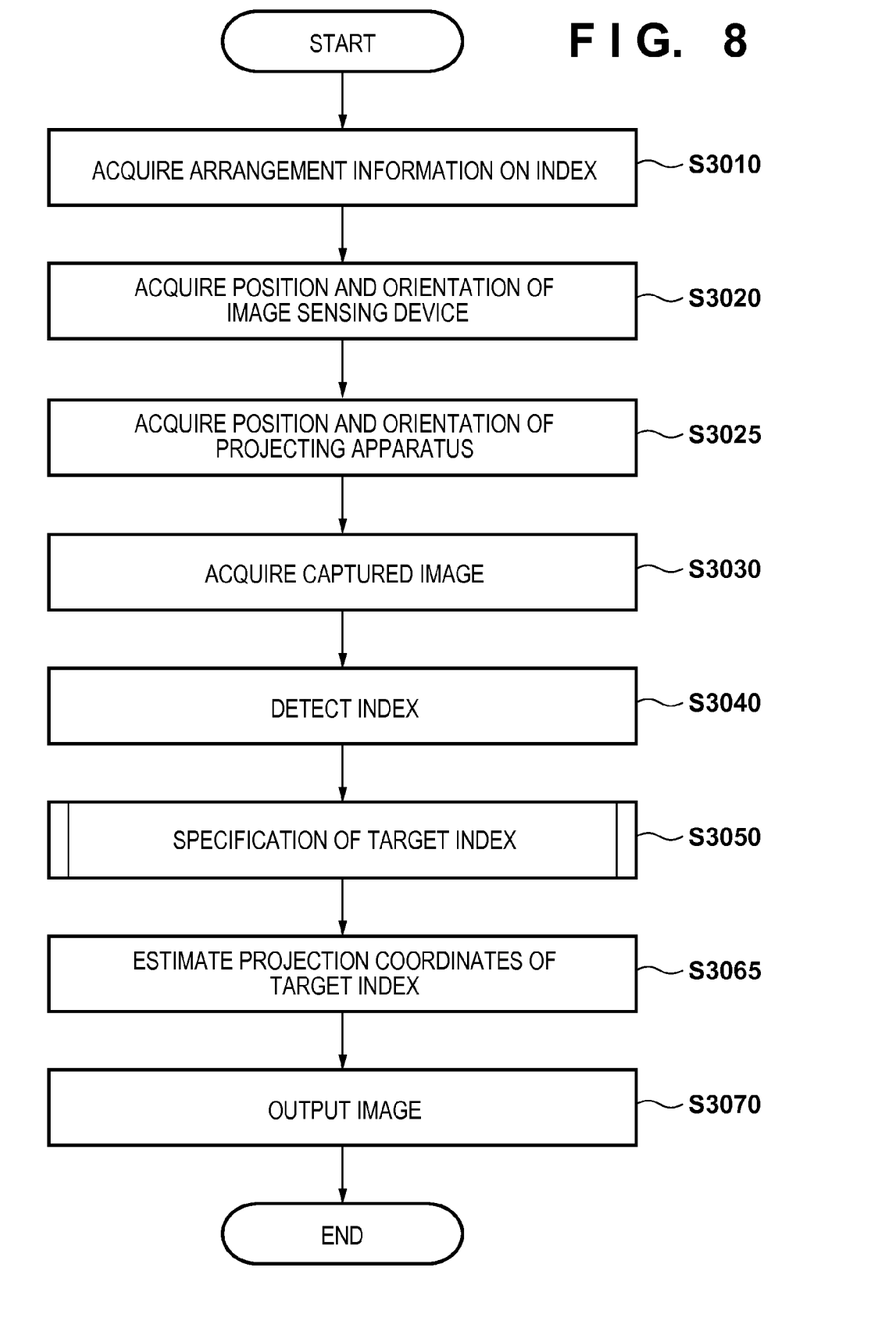
FIG. 8 is a flowchart of processing performed by an information processing apparatus 2000.

Next, sequential processing performed by the information processing apparatus 2000 according to the present embodiment for performing projection on the arrangement position of the target index so that the arrangement position indicates a position at which the target index is to be arranged will be described with reference to the flowchart shown in FIG. 8. It should be noted that processing according to the flowchart in FIG. 8 is performed on an image in each frame sent out from the image sensing device 100.

Because the processing in each step of steps S3010 and S3020 is the same as the processing in the above-described steps S2010 and S2020, description relating to these steps is omitted.

Step S3025

The position and orientation acquiring unit 1090 acquires the position and orientation of the display unit 400 input using the position and orientation input unit 500, and stores the acquired position and orientation in the data storage unit 1020.

Because the processing in each step of steps S3030 to S3050 is similar to the processing in the above-described steps S2030 to S2050, description relating to these steps is omitted.

Step S3065

Similarly to the first embodiment, the target index projecting unit 1070 obtains the projection position at which the arrangement position of the target index is projected on the display surface of the display unit 400 based on the position and orientation of the display unit 400. More specifically, letting the position of the display unit 400 in the world coordinate system be $t=[tx\ ty\ tz]^t$, and the orientation of the display unit 400 (in actuality, the orientation of the world coordinate system relative to the coordinate system unique to the display unit 400) be $\omega=[\omega x\ \omega y\ \omega z]$, processing similar to the processing in the above-described step S2060 is performed. In this manner, the processing for estimating the projection coordinates (ux, uy) of the target index from the position and orientation of the image sensing device and the arrangement information on the target index is similar to the processing for estimating the projection coordinates of the target index from the position and orientation of the display unit 400 and the arrangement information on the target index. Then, the target index projecting unit 1070 sends out the projection position obtained in this manner to the image output unit 1080.

Step S3070

The image output unit 1080 may generate an image in which a marker image representing the index is arranged at the projection position on the display surface of the display unit 400, or may generate an image in which an arrow indicating the projection position is arranged on the display surface. In short, any type of information can be adopted as information for projection as long as the user who looks at the projection result by the display unit 400 can understand the arrangement position of the target index in the physical space.

In this manner, as a result of projecting information indicating the projection position such that the information is superimposed on the physical space, the user can easily arrange the index in a short time.

Fourth Embodiment

The projection position is obtained by projecting the arrangement position of the target index on the display surface of the display unit 400 based on the position and orientation of the display unit 400 in the third embodiment, but in the case where this obtained projection position is located at a position outside of the display surface, it is not possible to project the information indicating the projection position. In view of this, with this embodiment, if such a case occurs, pan-tilt-zoom of the display unit 400 is controlled such that the projection position is brought into the angle of view of the display unit 400. Thus, in the case of the present embodiment, the display unit 400 is a projecting apparatus that can control the pan-tilt-zoom using a control signal from the information processing apparatus 1000.

If pan or tilt is controlled, the position and orientation of the display unit 400 changes. Also, if zoom is controlled, parameters for correcting lens distortion and parameters unique to the projecting apparatus, such as focal length, change. In view of this, it is sufficient to change parameters for the projecting apparatus in accordance with a change amount obtained by changing pan, tilt, or zoom of the image sensing unit 400. Calibration has been performed in advance such that a pan or tilt amount indicates rotation of projection. Accordingly, an offset amount of the rotational center of the display unit 400 and an offset amount of the rotational center of pan or tilt are obtained, and the obtained offset amounts are added to pan or tilt amount, as a result of which the orientation of the display unit 400 is obtained. A method for calibration may be any known method. Also, projecting apparatus parameters such as focal length and distortion correction coefficient that change in accordance with the zoom amount are also obtained for each zoom value in advance so as to create a look up table. As a result of referencing the table, the projecting apparatus parameter for each zoom value can be used.

In such a configuration, in the case where it is determined that the projection position is located at a position outside of the display surface, the target index projecting unit 1070 sends out a control signal for controlling at least one of pan, tilt, and zoom to the display unit 400, and therefore the display unit 400 can control at least one of pan, tilt, and zoom in accordance with the control signal. Thereafter, processing similar to that of the third embodiment is performed except that the projecting apparatus parameter obtained after this control is used. In the case where the projection position is still located at a position outside of the display surface, at least one of pan, tilt, and zoom is further controlled. Accordingly, finally, the projection position reaches the image coordinates on the display surface (in the image display surface).

In this manner, according to the present embodiment, even in the case where the projection position of the target index estimated from the position and orientation of the projecting apparatus and the arrangement information on the target index is not in the angle of view of the projecting apparatus, the projection position can be brought into the angle of view as a result of at least one of pan, tilt, and zoom of the projecting apparatus being controlled such that the projection position is in the angle of view.

Fifth Embodiment

Figure 7:
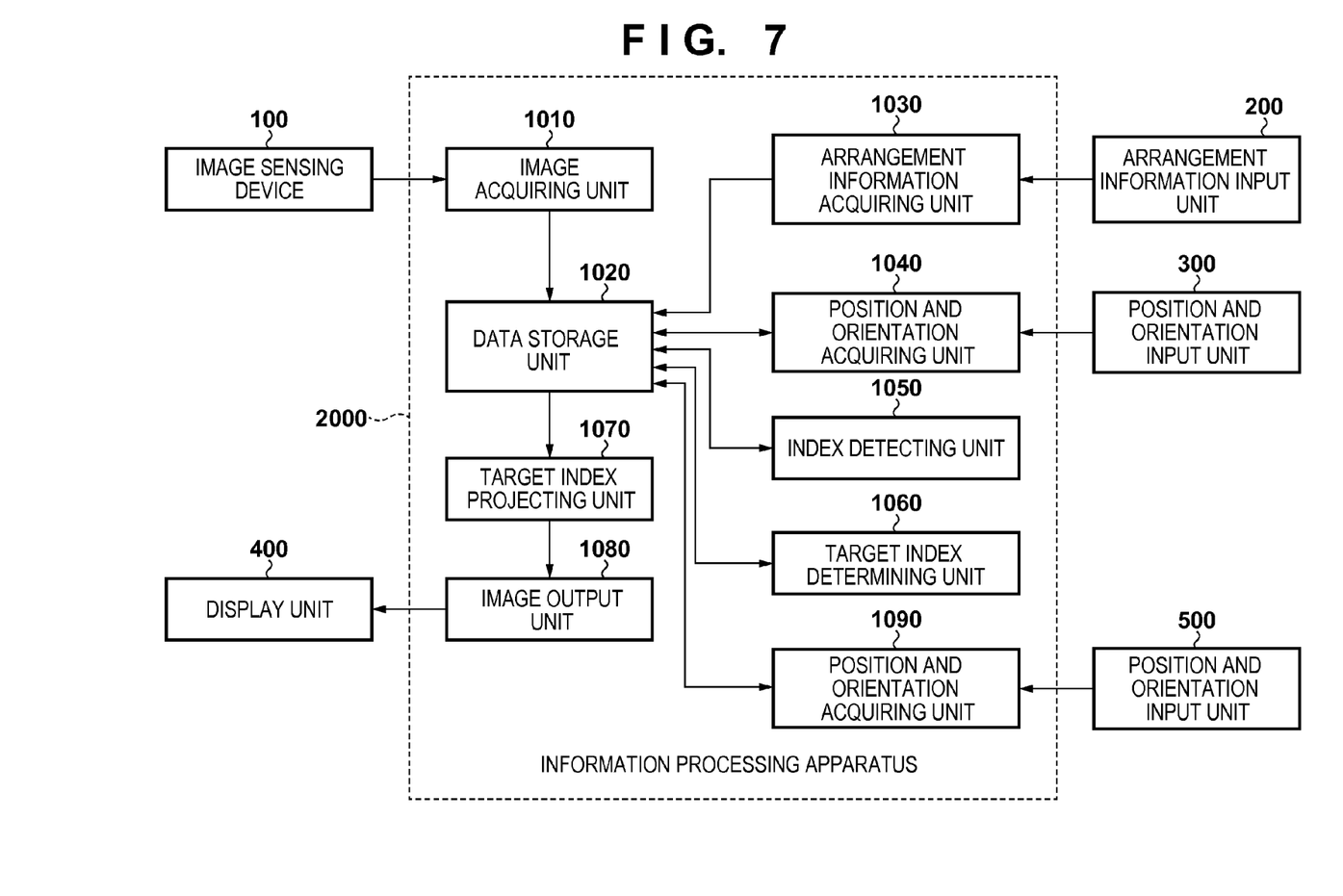
FIG. 7 is a block diagram showing a configuration example of a system.

Although the functional units that are included in the information processing apparatus 1000 and the information processing apparatus 2000 that are respectively shown in FIGS. 1 and 7 may be configured by hardware, a configuration can be used in which the data storage unit 1020 is configured by a memory device, and the other functional units are configured by software (computer programs). In this case, a computer that has such a memory device and can execute these computer programs can be applied to the information processing apparatus 1000 or the information processing apparatus 2000.

Figure 9:
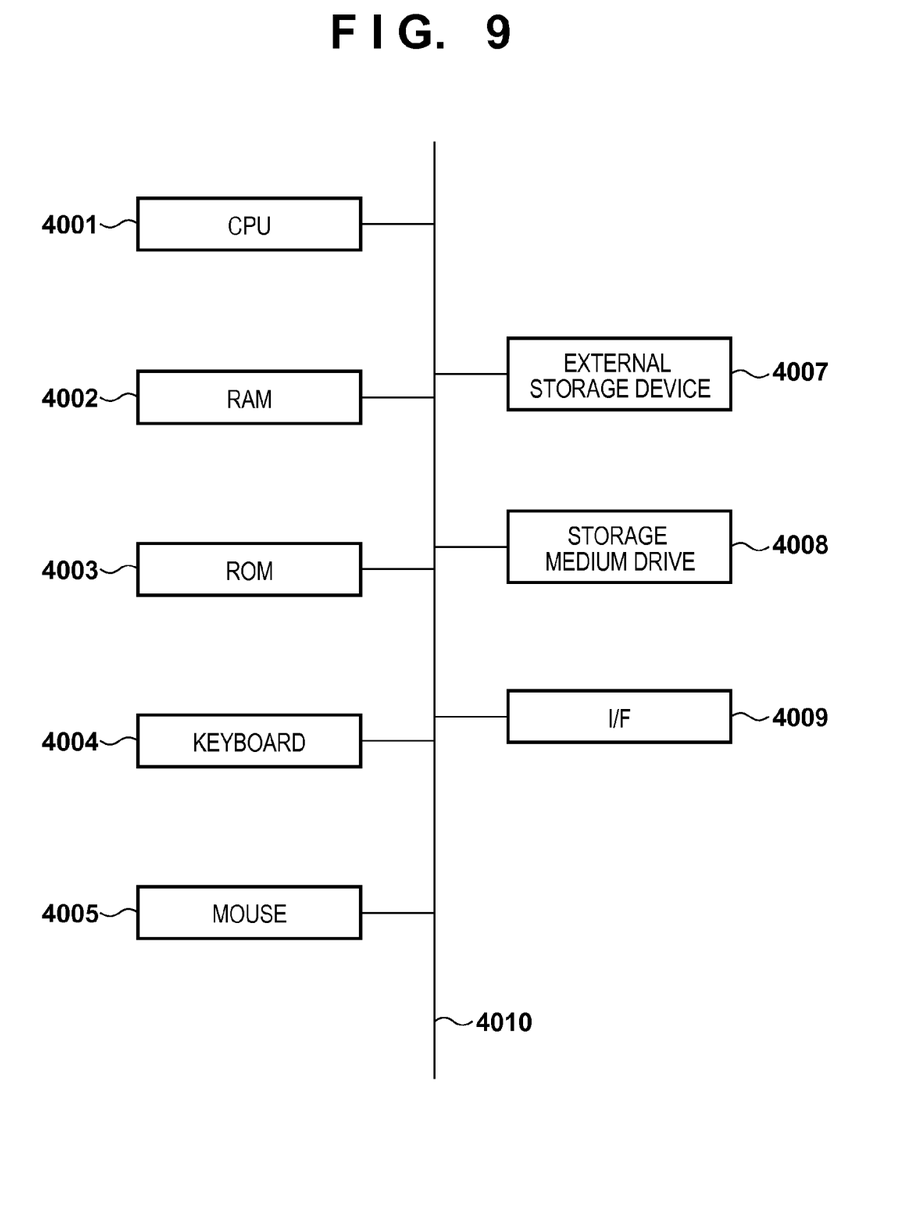
FIG. 9 is a block diagram showing a configuration example of hardware of a computer.

A hardware configuration example of such a computer will be described with reference to FIG. 9. It should be noted that the configuration shown in FIG. 9 is merely one example of the hardware configuration of such a computer, and the configuration is not limited to such a configuration.

A CPU 4001 executes processing using computer programs and data stored in a RAM 4002 and a ROM 4003 to perform control of the overall operations of this computer, and executes the processing that was described above as being executed by the information processing apparatus 1000 or the information processing apparatus 2000 to which this computer is applied.

The RAM 4002 has an area for storing computer programs and data loaded from an external storage device 4007 or a storage medium drive 4008. Also, the RAM 4002 has an area for storing data input from the outside (the image sensing device 100, the arrangement information input unit 200, the position and orientation input units 300 and 500, and the like) via an I/F (interface) 4009. Also, the RAM 4002 also has a work area that is to be used when the CPU 4001 executes various types of processing. In this manner, the RAM 4002 can appropriately provide various types of areas. For example, the RAM 4002 can also function as the data storage unit 1020 shown in FIGS. 1 and 7. The ROM 4003 stores computer programs and data that do not require rewriting, such as setting data, a boot program, and the like for this computer.

A keyboard 4004 and a mouse 4005 are examples of a user interface that the user of this computer operates so as to input various instructions and data, and by operating such a user interface, the user can input various instructions and data to the computer.

The external storage device 4007 is a mass information storage device represented by a hard disk drive device. The external storage device 4007 stores an OS (operating system), and computer programs and data for causing the CPU 4001 to execute the processing described above as being executed by the functional units other than the data storage unit 1020 in the information processing apparatus 1000 or the information processing apparatus 2000. The data includes information that is handled as known information in the above description. The computer programs and data stored in the external storage device 4007 are appropriately loaded in the RAM 4002 in accordance with the control performed by the CPU 4001, and are processed by the CPU 4001.

The storage medium drive 4008 is for reading out the computer programs and data stored in the storage medium such as a CD-ROM, DVD-ROM, and the like, and outputting the readout computer programs and data to the RAM 4002 or the external storage device 4007. It should be noted that portions of the computer programs or data that were described above as being stored in the external storage device 4007 may be stored in this storage medium.

The I/F 4009 is an interface for connecting devices such as the above-described image sensing device 100, arrangement information input unit 200, position and orientation input unit 300, position and orientation input unit 500, and the like to this computer. Although only one I/F is schematically shown in FIG. 9, in actuality, the I/F is provided in each device connected to this computer. For example, if the output of the image sensing device 100 is a digital output such as IEEE 1394, the I/F for connecting the image sensing device 100 to this computer is realized by for example, an IEEE 1394 interface board. Also, if the output of the image sensing device 100 is an analog output such as an NTSC signal or the like, the I/F for connecting the image sensing device 100 to this computer is realized by an analog video capture board.

The above-described units are connected to a shared bus 4010. Also, the present invention is not limited to a configuration in which the information processing apparatus 1000 or the information processing apparatus 2000 is configured by one computer, and the information processing apparatus 1000 or the information processing apparatus 2000 may be configured by two or more computers.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-100786, filed May 14, 2014, which is hereby incorporated by reference herein in its entirety.

What is claimed is:

1. An information processing apparatus comprising:
one or more processors; and
at least one memory coupled to the one or more processors, the at least one memory having instructions stored thereon which, when executed by the one or more processors, cause the information processing apparatus to:
acquire arrangement positions in a physical space, which are set in advance for a plurality of indices;
specify an index that satisfies a predetermined condition as a target index among indices included in an image of the physical space captured by an image capturing device having a known position; and
generate a notification of the arrangement position of the target index,
wherein the specifying the index as the target index among the indices included in the image includes specifying, as the target index, an index having a motion amount in the image that is larger than a predetermined threshold.

2. The information processing apparatus according to claim 1, wherein
the generating the notification includes projecting information relating to the arrangement position of the target index on a position corresponding to the arrangement position of the target index in the physical space.

3. The information processing apparatus according to claim 1, wherein the instructions, when executed by the one or more processors, further cause the information processing apparatus to:
obtain a position at which the arrangement position of the target index is projected on the image as a projection position based on the known position and an orientation of the image capturing device, and
composite information relating to the target index at the projection position on the image or in the vicinity thereof to display the composite image.

4. The information processing apparatus according to claim 3, wherein the instructions, when executed by the one or more processors, further cause the information processing apparatus to:
in a case where the projection position is located at a position outside of the image, control at least one of pan, tilt, and zoom of the image capturing device such that the projection position reaches a position inside the image.

5. The information processing apparatus according to claim 1, further comprising:
a projecting apparatus configured to obtain a projection position, at which the arrangement position of the target index is projected on an image display surface of the projecting apparatus, based on the known position and an orientation of the projecting apparatus and to project information indicating the projection position.

6. The information processing apparatus according to claim 5, wherein the instructions, when executed by the one or more processors, further cause the information processing apparatus to:
in a case where the projection position is located at a position outside of the image display surface, control at least one of pan, tilt, and zoom of the projecting apparatus such that the projection position reaches a position inside the image display surface.

7. The information processing apparatus according to claim 1, wherein the index has a square shape.

8. The information processing apparatus according to claim 1, wherein the known position of the image capturing device is fixed.

9. An information processing method performed by an information processing apparatus, comprising:
acquiring arrangement positions in a physical space, which are set in advance for a plurality of indices;
specifying an index that satisfies a predetermined condition as a target index among indices included in an image of the physical space captured by an image capturing device having a known position; and
generating a notification of the arrangement position of the target index,
wherein the specifying the index as the target index among the indices included in the image includes specifying, as the target index, an index having a motion amount in the image that is larger than a predetermined threshold.

10. A non-transitory computer-readable storage medium storing a computer program that, when executed by a computer, causes the computer to:
acquire arrangement positions in a physical space, which are set in advance for a plurality of indices;
specify an index that satisfies a predetermined condition as a target index among indices included in an image of the physical space captured by an image capturing device having a known position; and
generate a notification of the arrangement position of the target index,
wherein the specifying the index as the target index among the indices included in the image includes specifying, as the target index, an index having a motion amount in the image that is larger than a predetermined threshold.

11. An information processing apparatus comprising:
one or more processors; and
at least one memory coupled to the one or more processors, the at least one memory having instructions stored thereon which, when executed by the one or more processors, cause the information processing apparatus to:
acquire arrangement positions in a physical space, which are set in advance for a plurality of indices;

specify an index that satisfies a predetermined condition as a target index among indices included in an image of the physical space captured by an image capturing device having a known position; and generate a notification of the arrangement position of the target index, wherein the generating the notification includes superimposing information relating to the arrangement position of the target index on a captured image of the physical space, and causing a display to display the information being superimposed on the captured image.

12. The information processing apparatus according to claim 11, wherein among the indices included in the image, if a position of an index on the image and a corresponding position that corresponds to the arrangement position of the index on the image differs by a predetermined value or more, the index is specified as the target index.

13. The information processing apparatus according to claim 11, wherein the target index is an index held by a user.

14. The information processing apparatus according to claim 11, wherein the image capturing device is fixed on a ceiling or a wall.

15. An information processing method performed by an information processing apparatus, comprising:

acquiring arrangement positions in a physical space, which are set in advance for a plurality of indices;

specifying an index that satisfies a predetermined condition as a target index among indices included in an image of the physical space captured by an image capturing device having a known position; and generating a notification of the arrangement position of the target index, wherein the generating the notification includes superimposing information relating to the arrangement position of the target index on a captured image of the physical space, and causing a display to display the information being superimposed on the captured image.

16. A non-transitory computer-readable storage medium storing a computer program that, when executed by a computer, causes the computer to:

acquire arrangement positions in a physical space, which are set in advance for a plurality of indices;

specify an index that satisfies a predetermined condition as a target index among indices included in an image of the physical space captured by an image capturing device having a known position; and generate a notification of the arrangement position of the target index, wherein the generating the notification includes superimposing information relating to the arrangement position of the target index on a captured image of the physical space, and causing a display to display the information being superimposed on the captured image.

* * * * *